UNITED STATES PATENT OFFICE.

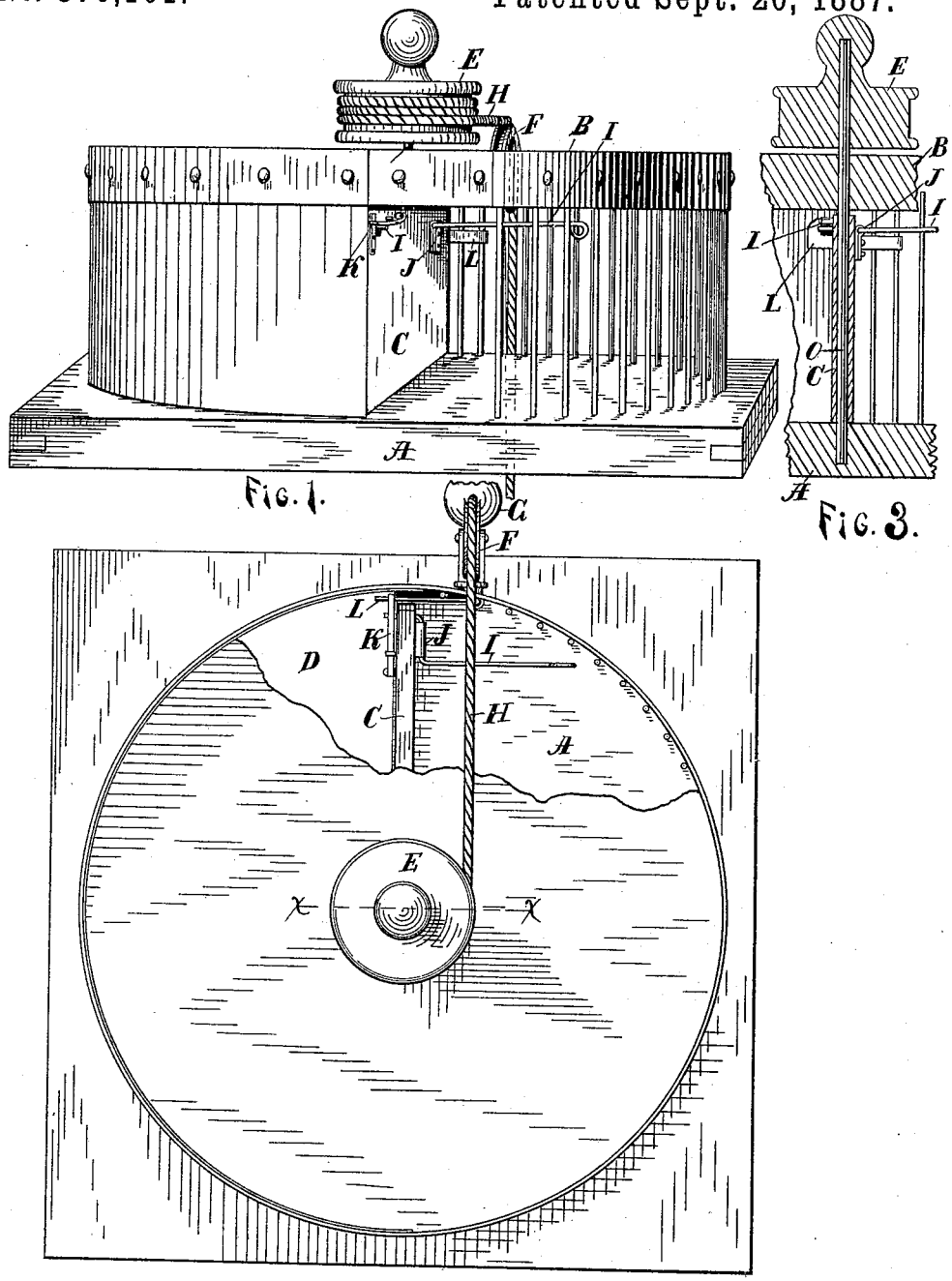

HENRY G. STONE, OF WALKER, MICHIGAN.

ANIMAL-TRAP.

SPECIFICATION forming part of Letters Patent No. 370,101, dated September 20, 1887.

Application filed April 7, 1887. Serial No. 234,001. (No model.)

*To all whom it may concern:*

Be it known that I, HENRY G. STONE, a citizen of the United States, residing in the township of Walker, in the county of Kent and State of Michigan, have invented certain new and useful Improvements in Animal-Traps, of which the following is a specification.

My invention relates to that class of traps designed to automatically remove the animal caught and put itself in position for further use; and the object of my invention is to simplify and improve the mechanism accomplishing this automatic action. This object I accomplish by means of the mechanism illustrated in the accompanying drawings, in which—

Figure 1 is a perspective view of the trap set and ready for use. Fig. 2 is a top plan view of the same with a portion of the top, as shown by the irregular line, cut away, so as to show the interior construction; and Fig. 3 is a vertical sectional view on the line X X of Fig. 2, being the central portion of the device.

Similar letters refer to similar parts throughout the several views.

A is the base or platform of the trap, being a plain flat board, which has cut out therefrom a semicircular portion, (indicated by D in Fig. 2,) being one half of the circle inclosed by the side walls of the trap.

B is the top of the trap, preferably circular in form, and elevated a considerable distance above the base A. This top B is circular in form, and the space between its edge and the base is inclosed by a circular wall, one half of such wall being solid, as shown in Fig. 1, and the other half being composed of wires or other open-work, as shown in the same figure.

C is a partition extending across the interior of the trap from side to side in such position that the solid half of the circular wall will be upon one side of the partition and the open-work half thereof will be on the other side of the partition. That part of the base which is cut away, being semicircular in form, will then be inclosed by the solid portion of the side wall and by the partition C.

E is a drum placed above the center of the top of the trap, and having attached to it the shaft or spindle O, (shown in Fig. 3,) passing down through the top B, the partition C, and into a bearing in the bottom A, and attached rigidly to the partition C, but passing loosely through the top B, so that when the drum and shaft are revolved the partition C will revolve with them.

F is a pulley located upon the edge of the top of the trap, over which passes a cord, H, which is attached to and wound around the drum E, and has attached at the other and lower end thereof a weight, G, sufficiently heavy to cause a considerable continuous tension of the cord H.

K is a spring-latch placed upon one of the upper corners of the partition, the end of the latch being about flush with the end of the partition.

L is a catch attached to the side of the trap, and having a notch or lug thereon in such a way that as the partition is revolved the latch K will catch against the lug or notch, and the further revolution of the partition will be stopped. Each upper corner of the partition is cut away sufficiently to allow it to revolve past this catch.

I is a small pin or wire passing through a slot in the partition, and having one end passing under the spring-latch K. The other end is extended some distance, and has a hook or other suitable device for attaching the bait. The latch K and wire I are duplicated upon the other upper corner of the partition, but upon the opposite side.

The operation of my invention is as follows: The trap is placed over a tub of water or other suitable receptacle and the bait is attached to the extended end of the wire I, which projects into the part of the trap surrounded by the open-work, so that it is visible from the outside. In this open-work a gap is left of sufficient width to allow the entrance of the animal designed to be caught. A slight downward motion given to the wire I through the bait attached thereto will lift the other short end of the wire, and thereby lift the latch K, so as to release its engagement with the catch L. The tension upon the cord H, caused by the weight thereupon, causes the partition rapidly to make one half-revolution, when it is stopped by the latch upon the other end engaging with the catch L. This revolution of the partition will sweep around into the other half of the trap the animal within the open-work half, and it will be thus dropped into the water beneath the trap, and a similar bait having been applied to the other wire I, it will be again in readiness for use.

I am aware of previous devices having the revolving partition or fly and operating in a somewhat similar manner; but my invention is simpler in form and operation, and is without any catch or obstruction upon the bottom, and without the rods attached to the fly and dragging upon the bottom, which form an impediment to the working of the device in such other inventions.

Having thus described my invention, what I claim to have invented, and desire to secure by Letters Patent, is—

An animal-trap comprising a partly-solid and partly-open casing, having the top B and base A, constructed as described, the revoluble partition C, having its upper corners cut away, the latches K K, attached to said partition at said upper corners, the catch L, attached to the side wall of the casing, the bait wires or rods I I, passing through slots in the partition and under said latches K K, the spindle O, the drum E, the cord H, and the weight G, substantially as described.

HENRY G. STONE.

Witnesses:
ARTHUR C. DENISON,
EMILY A. PELTON.